United States Patent
Herrod et al.

(10) Patent No.: US 8,970,480 B2
(45) Date of Patent: Mar. 3, 2015

(54) SYSTEM AND METHOD OF DEVICE MANAGEMENT ON EXTENSIBLE AND CONFIGURABLE DETECTION OF ELECTRONIC DEVICE INTERACTIONS

(75) Inventors: Allan Herrod, Mission Viejo, CA (US); Deepak Ayyagari, Madhapur (IN); Edward Rowlance, Canal Fulton, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 258 days.

(21) Appl. No.: 13/617,104

(22) Filed: Sep. 14, 2012

(65) Prior Publication Data

US 2014/0078037 A1 Mar. 20, 2014

(51) Int. Cl.
*G09G 5/00* (2006.01)
(52) U.S. Cl.
USPC ............................ 345/156; 345/619; 345/467
(58) Field of Classification Search
USPC ........ 345/156, 619, 467; 709/228; 705/14.45; 707/752; 715/817
See application file for complete search history.

(56) References Cited

U.S. PATENT DOCUMENTS

| 8,620,933 | B2 * | 12/2013 | Holmes et al. ................. 707/752 |
| 2009/0106753 | A1 | 4/2009 | Wang et al. | |
| 2011/0138064 | A1 * | 6/2011 | Rieger et al. .................. 709/228 |
| 2011/0187652 | A1 | 8/2011 | Huibers | |
| 2011/0191438 | A1 | 8/2011 | Huibers et al. | |
| 2011/0191823 | A1 | 8/2011 | Huibers | |
| 2012/0054682 | A1 * | 3/2012 | Bell et al. ........................ 715/817 |
| 2013/0076780 | A1 * | 3/2013 | Reeves et al. ................. 345/619 |
| 2013/0166376 | A1 * | 6/2013 | Cohen et al. ............... 705/14.45 |

FOREIGN PATENT DOCUMENTS

| EP | 2498518 A2 | 9/2012 |
| WO | 2007144419 A2 | 12/2007 |

OTHER PUBLICATIONS

Dev, R., "Bump Technologies: exchange contact info and other data with other people by tapping your phones together," accessed at http://intellectuallylegal.wordpress.com/2011/09/04/bump-technologies-exchange-contact-info-and-other-data-with-other-people-by-tapping-your-phones-together/, Sep. 4, 2011, pp. 7.

(Continued)

*Primary Examiner* — Thuy Pardo

(57) ABSTRACT

A system and method determines a management action as a function of device interactions. The method includes determining a first interaction data generated by an electronic device, the first interaction data being indicative of at least one of a device user interaction, a device environment interaction, and a device state interaction. The method includes generating, by the electronic device, a first notification data as a function of the first interaction data. The method includes transmitting the first notification data from the electronic device to a remote device management server. The method includes determining, by the device management server, a first management action data as a function of the first notification data, the first management action data being indicative of a functionality to be applied to the electronic device.

22 Claims, 2 Drawing Sheets

(56) References Cited

OTHER PUBLICATIONS

Patently Apple., "Apple Wants to Beat HP's WebOS Sharing Feature with Something Cooler," accessed at http://www.patentlyapple.com/patently-apple/2011/07/apple-wants-to-beat-hps-webos-sharing-feature-with-something-cooler.html, Jul. 7, 2011, pp. 10.

International Search Report and Written Opinion for International Patent Application No. PCT/US2013/055715 mailed Aug. 20, 2013.

\* cited by examiner

SYSTEM AND METHOD OF DEVICE MANAGEMENT ON EXTENSIBLE AND CONFIGURABLE DETECTION OF ELECTRONIC DEVICE INTERACTIONS

FIELD OF THE DISCLOSURE

The invention relates to a system and method of device management by a device management system. More specifically, the invention relates to reactively providing management actions, proactively providing management actions, and determining when management actions are provided.

BACKGROUND

An electronic device may be configured with a variety of interactions that enable a particular functionality to be executed. Accordingly, a local management system of the electronic device may be utilized. Among the interactions, gestures may be used on the electronic device for a specified functionality to be performed. For example, when the device is configured with a media player having a playlist, the electronic device may be shaken to randomize the playlist. In another example, two electronic devices may be bumped together to indicate a desire to transfer a file from the first electronic device to the second electronic device. However, these methods are generally highly specific to a particular application and aimed at an application-specific purpose. That is, there is no general purpose of identifying devices for which management actions will be taken.

A conventional device management system for a plurality of managed electronic devices allows the system to provide management actions to the managed electronic devices. Accordingly, a global or remote management system may be utilized. For example, when the electronic devices are bumped together, a respective signal may be transmitted from the two electronic devices to a central management system to indicate the desired functionality. However, in a substantially similar manner, these methods are highly specific to the application and aimed at the application-specific purpose despite the use of the global management system being utilized.

Accordingly, there is a need for an extensible and configurable approach that allows for dynamic defining of interactions with electronic devices that is used by a management system to identify the managed devices as requiring management action.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
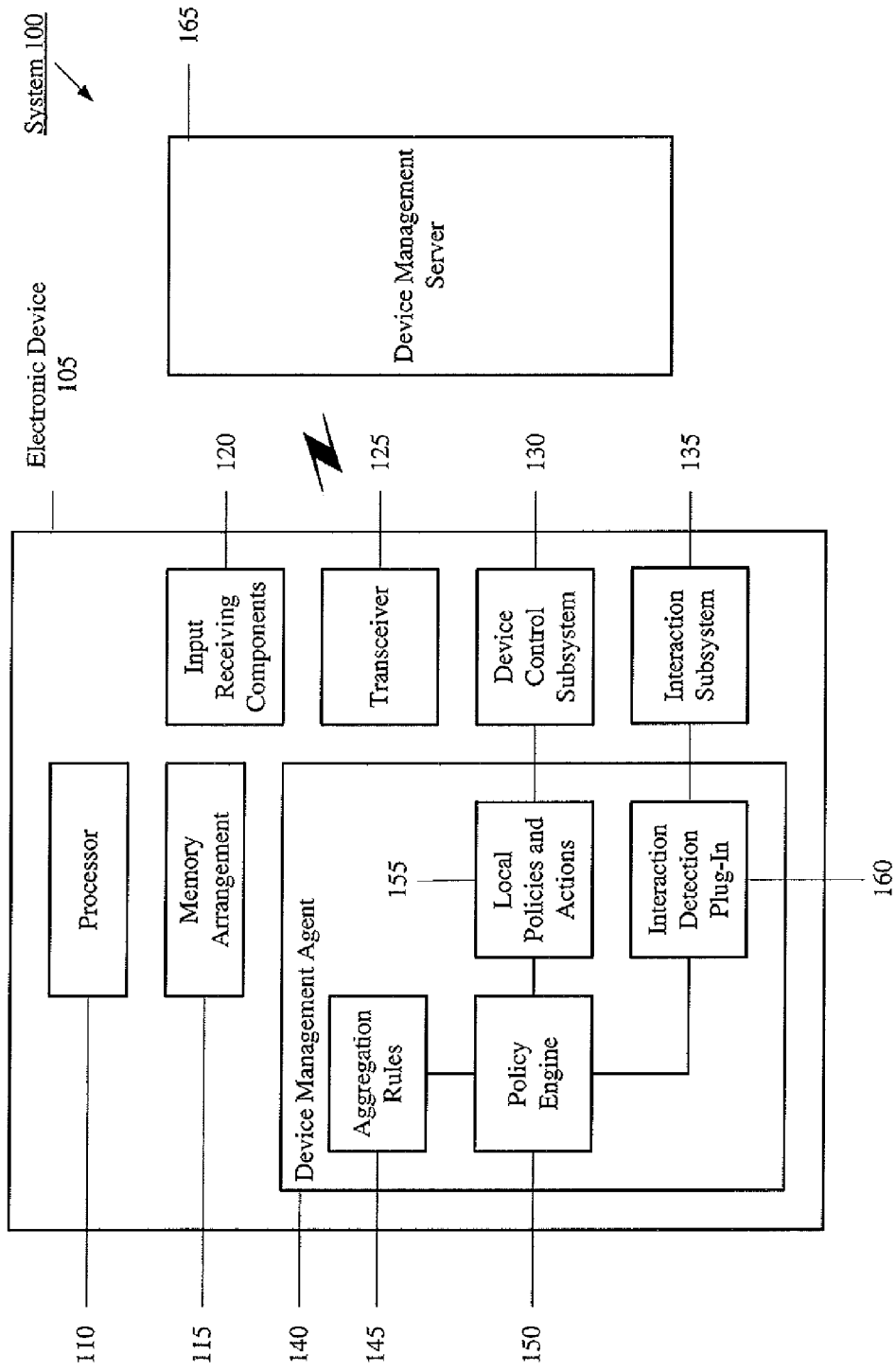
FIG. 1 illustrates a block diagram showing a system for device management in accordance with some embodiments.
Figure 2:
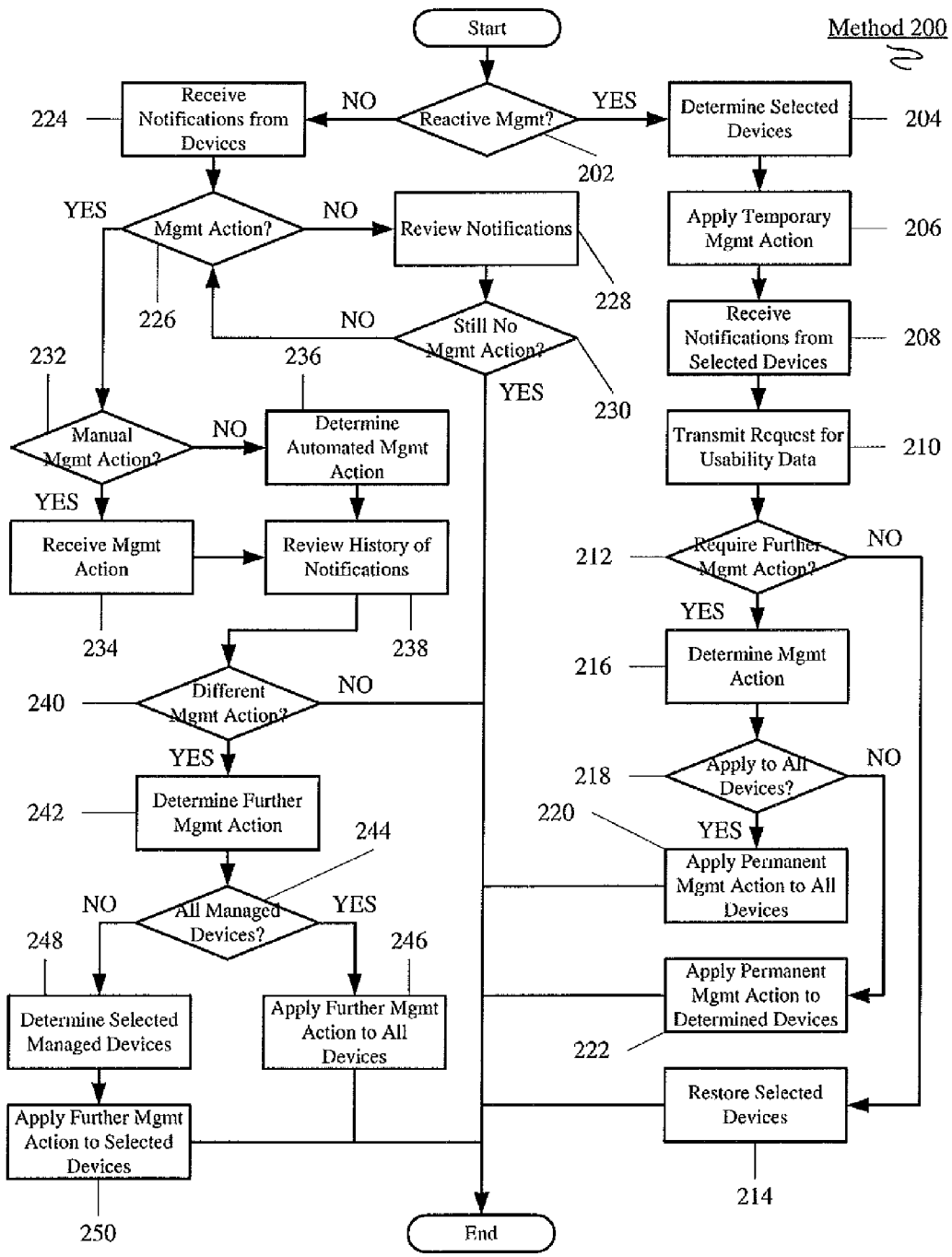
FIG. 2 illustrates a flowchart of a method for managing electronic devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a system and method for determining a management action as a function of device interactions. The method comprises determining a first interaction data generated by an electronic device, the first interaction data being indicative of at least one of a device user interaction, a device environment interaction, and a device state interaction; generating, by the electronic device, a first notification data as a function of the first interaction data; transmitting the first notification data from the electronic device to a remote device management server; and determining, by the device management server, a first management action data as a function of the first notification data, the first management action data being indicative of a functionality to be applied to the electronic device.

The exemplary embodiments may be further understood with reference to the following description and the appended drawings, wherein like elements are referred to with the same reference numerals. The exemplary embodiments describe a system and method for providing device management by a device management server to a plurality of managed electronic devices. Specifically, the device management may be performed in a variety of manners. For example, the device management may be performed reactively in which the device management system determines device management actions as a function of a temporary configuration and proactively in which the device management system determines device management actions as a function of notifications from the managed devices. The device management and methods thereof, the device management system, the managed electronic devices, the notifications, and a related method will be discussed in further detail below.

FIG. 1 is a block diagram showing a system 100 for device management in accordance with some exemplary embodiments of the present invention. Accordingly, the system 100 may be a device management system. The system 100 may include an electronic device 105 and a device management server 165. The system 100 may further relate to when the device management server 165 provides and/or performs management actions for a plurality of managed electronic devices 105. Accordingly, the system 100 may include further electronic devices (not shown) that are managed by the device management server 165. The electronic device 100 may be any device such as a portable device including mobile phone, a personal digital assistant, a smartphone, a tablet, a laptop, a barcode reader, etc. or a non-portable device including a desktop computer. However, it should be noted that the electronic device 100 may represent any type of device that is configured as a managed device of the device management system 100. As illustrated in FIG. 1, the electronic device 105 may include a processor 110, a memory arrangement 115, input receiving components 120, a transceiver 125, a device control subsystem 130, an interaction subsystem 135, and a device management agent 140. It should be noted that the electronic device may include other components such as a portable power supply (e.g., a battery) (not shown).

The processor 110 may provide conventional functionalities for the electronic device 105. For example, the electronic device 100 may include a plurality of applications that are executed on the processor 110 such as an application including a web browser. As will be discussed in further detail below, the processor 110 may be configured to determine an interaction between the electronic device and a device user, an operating environment, and a device state. The memory 115 may also provide conventional functionalities for the electronic device 105 such as storing data related to operations performed by the processor 110. The input receiving components 120 may include a plurality of different devices that are configured to determine the interactions between the electronic device 105 and the device user, the operating environment, and the device state. The interactions will be discussed in further detail below. The transceiver 125 may be any conventional component configured to transmit and/or receive data. Specifically, the transceiver 125 may be communicatively connected to the device management system (e.g., a network connection, a direct wireless connection, a direct wired connection, etc.).

The electronic device 105 may be any managed device of the device management system. The electronic device 105 may have a variety of different ways to interact with the device user and the operating environment via the input receiving components. Similarly, there may be various aspects of the internal state of the electronic device 105. Accordingly, there may be several forms of interactions between the electronic device and the device user, the operating environment, and the device state in which a basis is formed for management actions to be performed.

The device user interactions may include a variety of different types. In a first example, the input receiving components 120 may include a touch screen to receive a gesture thereon. Thus, a 2-dimensional graphical interface may be provided in which the user enters an input directly on a surface of the touch screen. In a second example, the input receiving components 120 may include an accelerometer to receive a gesture performed with the electronic device 105. Thus, a 3-dimensional interface may be provided in which the user enters a spatial input such as a shaking motion. In a third example, the input receiving components 120 may include a physical (e.g., QWERTY keyboard) or logical keyboard (e.g., digital display of inputs) to receive inputs via a key pad. In a fourth example, the input receiving components 120 may include an audio receiving component to receive audio commands spoken by the device user. In a fifth example, the input receiving components 120 may include a pressure sensor to receive pressure inputs performed on a housing of the electronic device 105 such as a squeezing motion. In a sixth example, the input receiving components 120 may include a proximity sensor to determine a proximity of the device user to the electronic device 105.

The operating environment interactions may also include a variety of different types. In a first example, the input receiving components 120 may include a light sensor configured to determine an ambient light level in an area in which the electronic device 105 is disposed. In a second example, the input receiving components 120 may include a compass device that determines a physical orientation with respect to a constant (e.g., magnetic north). In a third example, the input receiving components 120 may include a gravitational sensor to determine a physical orientation relative to gravity (e.g., vertical disposition, horizontal disposition, face up, face down, etc.). In a fourth example, the input receiving components 120 may include positional sensors to determine a variety of different forms of data regarding physical location, heading, bearing, speed, etc. In a fifth example, the input receiving components 120 may include a thermometer to determine an ambient temperature in the area in which the electronic device 105 is disposed. In a sixth example, the input receiving components 120 may include an ambient motion sensor to determine if the device is vibrating, shaking, etc. from causes in the environment in which the electronic device 105 is disposed. In a seventh example, the input receiving components 120 may adapt the accelerometer to determine extreme motions applied to the electronic device 105 such as if the device has been dropped, impacted, etc. In an eighth example, the input receiving components 120 may include a clock to determine a local time and date at the location in which the electronic device 105 is disposed. In a ninth example, the input receiving components 120 may include an audio receiving component configured to determine an ambient noise level.

The device state interactions may further include a variety of different types. In a first example, the processor 110 of a portable electronic device may determine a battery level of the internal power supply. In a second example, the processor 110 of a portable electronic device may determine whether an external power supply is being used to charge the internal power supply and/or providing an auxiliary power supply in which the electronic device 105 is running. In a third example, the processor 110 may receive data from the transceiver 125 to determine a wireless signal level. In a fourth example, the processor 110 may determine connectivity of whether a viable connection to a network node or further electronic device is established. In a fifth example, the processor 110 may include an authentication system to determine an identity and privileges awarded to the device user. In a sixth example, the processor 110 may monitor the storage capacity of the memory arrangement 115 to determine a remaining storage capacity. In a seventh example, the processor 110 may monitor the applications being run thereon to determine a utilization thereof such as if the device is busy performing a particular functionality. In an eighth example, the processor 110 may determine whether a particular application requires pre-emption or should take precedence over other applications such as if an emergency call is being placed.

With the various interactions capable of being performed with regard to the electronic device 105, the electronic device 105 may include specific hardware such as those discussed above and/or software subsystems such as the interaction subsystem 135 that are dedicated to detecting the interactions between the device and the device user, the operating environment, and the device state. It should be noted that any one device or a plurality of devices may have a plurality of such interactions and hence a corresponding plurality of hardware and/or software subsystems may be utilized to detect those interactions.

The device management agent 140 may be a localized device management component for the electronic device 105. Specifically, the device management agent 140 may handle the device-side tasks related to determining the state of the device, informing the device management server 165 of the device state, and performing management activities requested by the device management server 165. In a preferred exemplary embodiment of the present invention, a variety of managed devices of the system 100 are all managed by the same device management server 165, thereby all the managed devices would utilize a common device management agent installed thereon.

To enable a common device management agent 140 to be used to detect a variable and extensible set of device interactions, the device management agent 140 may utilize a collection of interaction detection plug-ins 160. Each such interaction detection plug-in 160 may interface with a particular hardware of the input receiving components 120 and/or software subsystem such as the interaction subsystem 135 that are dedicated to detecting one or more specific types of interactions. For example, an interaction detection plug-in 160 may interface with a gesture subsystem of the interface subsystems 135, another interaction detection plug-in 160 may interface with the orientation subsystem of the interface subsystems 135, and yet another interface detection plug-in 160 may interface with an ambient light sensor subsystem of the interface subsystems 135.

To handle cases where it may be necessary or desirable to detect a combination of interactions on a given device, the device management agent 140 may include aggregation rules 145 and a policy engine 150 to logically infer new, higher level types of interactions from combinations of lower level interactions. For example, a combination of interactions may be (1) shaking the electronic device 105, (2) performed while the electronic device 105 is inverted (e.g., face down), and (3) while the ambient light level is low (e.g., in the dark). Such a higher level interaction may then be treated in a manner similar to any other interaction by the device management agent 140 (if the management is performed locally) or by the device management server 165 (if the management is performed remotely).

The detection of a given interaction on a managed electronic device 105 may be preferred to be used to trigger a performance of a management action locally on the electronic device 105. Accordingly, the device management agent 140 may include the device control subsystem 130. The management action to be performed may be determined via local policies and actions 155 that are previously configured to the managed electronic device 105. For example, if the above described combination of interactions is detected, a previously configured local policy may indicate that a previously configured local action is to place the electronic device into a "flashlight" mode. It should be noted that the local policies and actions 155 that are previously configured may be dynamically configured by the device user and/or the device management server 165. For example, when the device user configures the local policies and actions 155, the device user may enter a personal interaction that results in a predetermined management action to be performed. In another example, when the device management server 165 configures the local policies and actions 155, the device management server 165 may transmit data to the electronic device 105 via the transceiver 125. Thus, the local policies and actions 155 may be received from the device management server 165.

When the local detection of an interaction results in the autonomous performance of a local action by the electronic device 105 based on the local policies and actions 155, the electronic device 105 may transmit a notification to the device management server 165 via the transceiver 125. The notification may indicate that the interaction was detected and that local action was taken as a result. It should be noted that the transmission of the notification may be configured to be disabled so that the electronic device 105 does not transmit the notification.

In the preferred exemplary embodiment of the present invention, the device management server 165 may receive a plurality of notifications from the electronic device 105 as well as from the other managed electronic devices of the system 100. The device management server 165 may utilize the notifications in a variety of manners to provide remote device management actions.

In a first example, the device management server 165 may be configured to provide a manual management action to the electronic device 105. The manual management may relate to an administrator of the device management server 165 receiving the notification and provide the appropriate management action to be performed. Thus, the detection of a given interaction on the managed electronic device 105 may be used to notify the device management server 165 that the interaction has been detected. Subsequently, the notification may be used by the administrator running the device management sever 165 to determine that certain devices should be subjected to manually initiated management actions. For example, when a first electronic device bumps a second electronic device and the management action is determined manually by the administrator, the administrator may determine that the first electronic device is subject to the manually initiated management action of transferring a file through transmission while the second electronic device is subject to the manually initiated management action of transferring a file through reception. Such a manual management action may optionally elect to combine the presence of one or more such notifications with other information known about the electronic device 105 to determine if the management action is even required and, if so, what management action should be undertaken.

In a second example, the device management server 165 may be configured with its own set of defined policies or rules to combine one or more notifications that device interactions had occurred for one or more managed devices including the electronic device 105 with other information known about those managed devices to automatically determine if and/or when a management action should be performed and, if so, which management actions should be initiated. For example, the detection of a given interaction on a group of managed devices may be determined to result in the performance of a given management action only for managed devices on which a specifically identified application is also known to be installed. Accordingly, the device management server 165 may initially determine the management action to be performed or provided to the managed devices but may further determine the select managed devices that require the management action to be performed or provided. That is, the device management server 165 may determine that not all of the managed devices require the management action.

In a third example, the device management server 165 may store a history of notifications that interactions have occurred and may elect to use that history to determine if and/or when management action should be performed for a managed device. For example, if the same interaction is detected a specified number of times within a given time period, the device management server 165 may determine that a different (e.g., more costly) management action should be performed to remedy a problem that is not being resolved by another (e.g., less costly) management action. For example, if shaking the device results in performing a reboot to reset a misbehaving application, then many repetitions may lead to the deployment of an experimental version of the application that may fix the underlying problem of the misbehaving application.

In a fourth example, the device management server 165 may use the history of notifications that interactions have occurred from some or all members of a group of managed devices to determine that a management action should be performed to some or all of the managed devices in that group. For example, if frequent reboots have led to the deployment of an experimental version of the application to enough managed devices in a group, the device management server 165 may be determined that the best course of action would be to proactively deploy the experimental version of the application to all the managed devices in the group as a preventative measure.

In a fifth example, it may be preferred that no management action should be taken as a result of a given detected interaction on one of the managed devices. Instead, it may be most valuable to simply provide a means to query and view the set of managed devices for which that interaction has been detected. For example, it may be desirable to view the set of managed devices that have recently been in a freezer (e.g., low ambient temperature) and then subsequently have been dropped (e.g., extreme motion) since they may be expected to show a higher rate of failure and bear watching. Accordingly, the device management server 165 may not provide an immediate management action for these managed devices but become aware that these managed devices having the known set of interactions may require a management action at some point in time.

In a sixth example, it may be desirable to operate reactively instead of proactively. The previously described examples mostly assume that the managed devices are perpetually watching for certain device interactions and providing notifications to the device management server 165. However, in a reactive operation mode, there may be cases where managed devices may be dynamically and temporarily reconfigured to watch for certain device interactions to achieve some particular end. For example, an administrator of the device management server 165 may wish to perform some management action but is unsure of the set of managed devices to which that management action should be performed.

In the reactive operation mode, the administrator of the device management server 165 may request that all managed devices that are potential candidates be temporarily reconfigured to watch for some new and unique device interaction. The administrator of the device management server 165 may then watch for notifications indicating the pre-selected device interaction had occurred on select ones of the managed devices. Once the administrator of the device management server 165 takes whatever management action is required, the temporary reconfiguration of the selected managed devices to watch for that device interaction could be reversed. For example, the administrator of the device management server 165 may request that all managed devices with a given device model and that currently have a memory load of higher than some threshold be configured to look for some specific device interaction (e.g., a small upward vertical motion of device). In conjunction with this, a message may be sent to all these selected managed devices requesting the device user to indicate if slow application response is being experienced. In this way, the administrator of the device management server 165 may determine which managed devices require action to correct a known application bug.

Accordingly, in the reactive operation mode, policies or rules may be defined within the system 100 on the device management server 165 to detect certain conditions or interactions that indicate that managed devices detect certain situations or interactions that occur with managed devices and automatically reconfigure them dynamically and temporarily to look for some specific device interaction(s). If the temporarily configured device interaction occurs on some of the managed devices within some bounded time period, then a defined management action may be automatically initiated. Conversely, if the temporarily configured device interaction does not occur within the bounded time period, then the device management server 165 may determine that no management action is required. In either case, once the bounded time period passed, all devices that were temporarily configured may be restored to their prior configuration.

FIG. 3 is a flowchart of a method 200 for managing electronic devices in accordance with some exemplary embodiments of the present invention. Specifically, the method 200 relates to when the device management server 165 provides management actions or manages the electronic device 105 in the system 100. The method 200 will be described with reference to the device management server 165 and a remote device management. Accordingly, the method 200 will be described with reference to the system 100 of FIG. 1 including the electronic device 105 and the device management server 165.

In step 202, the device management server 165 determines whether a reactive management is to occur. As discussed above with regard to the sixth example, the device management server 165 may determine management actions reactively, rather than proactively. If the device management is to be performed reactively, the method 200 continues to step 204.

In step 204, the device management server 165 determines which of the managed devices the reactive device management is to be applied. As discussed above, the reactive device management may only relate to specified managed devices that have certain interactions performed, predetermined device models, etc. Once the selected managed devices are determined, in step 206, the device management server 165 applies a temporary management action. As discussed above, the selected managed devices may be dynamically and temporarily reconfigured to watch for certain device interactions to achieve some particular end. Thus, once temporarily reconfigured, in step 208, the device management server 165 receives notifications from the selected managed devices of the interactions performed on the selected managed devices. In step 210, the device management server 165 may transmit a request for usability data relating to the temporary reconfiguration. As discussed above, the device management server may request from the device users of the selected managed devices whether a slow application response is being experienced.

In step 212, the device management server 165 determines if further management action is required. As discussed above, the device management server 165 may determine that a permanent management action is required to correct a known application bug from the notifications and usability data received. If no further management action is required, the method 200 continues to step 214 where the selected managed devices are restored and the temporary configuration is reversed. However, if further management action is required, the method 200 continues to step 216. In step 216, the device management server 165 determines the permanent management action. In step 218, the device management server 165 determines if the permanent management action is to apply to all the managed devices. If all the managed devices require application of the permanent management action, the method 200 continues to step 220 where the permanent action is applied to all the managed devices. If only selected ones of the managed devices require application of the permanent management action, the method 200 continues to step 222 where the permanent action is applied to all the determined managed devices that require the application. It should be noted that after steps 220 and 222, the method 200 may also continue to step 214 so that the temporary management action is reversed.

Returning to step 202, if the device management is to be performed proactive, the method 200 continues to step 224. In step 224, the device management server 165 receives notifications from the managed devices such as the electronic device 105 via the transceiver 125. The device management server 165 may utilize the notifications in a variety of manners. Thus, in step 226, the device management server 165 determines if a management action is required. If no management action is required, the method 200 continues to step 228 in which the device management server 165 reviews the notifications. As discussed above with regard to the fifth example, the device management server 165 may view the managed devices having specific interactions occurring. Thus, in step 230, the device management server 165 makes a determination whether a management action is still not required. If no management action is required, the method 200 ends and the device management server 165 is alerted to the interactions as discussed above in the fifth example. However, if the device management server 165 determines that a management action is indeed required, the method 200 returns to step 226.

Returning to step 226, if the device management server 165 determines that a management action is required, the method 200 continues to step 232. In step 232, the device management server 165 determines whether a manual management action is required. As discussed above with regard to the first example, the manual management action may be determined by the administrator of the device management server 165. Thus, upon the administrator determining the management action, in step 234, the device management sever 165 receives the determined management action. However, if an automated management action is required, the method 200 continues from step 232 to step 236. In step 236, the device management server 165 determines the management action that is required. As discussed above with regard to the second example, the device management server 165 may be configured with its own policies or rules to determine the management action.

After step 234 or 236, the method 200 continues to step 238. In step 238, the device management server 165 reviews the history of notifications received from the managed devices. As discussed above with regard to the third and fourth examples, the history of notifications may be utilized by the device management server 165 in a variety of manners. Thus, in step 240, the device management server 165 determines if a different management action is required from the history of notifications.

If a further management action is required, the method 200 continues to step 242 where the device management server 165 determines this further management action. The policies or rules may be used again in which a higher level of management is determined from the lower levels of management discussed above in the local management of the electronic device 105. It should also be noted that the further management action may be determined manually (not shown) in a manner substantially similar as discussed above with reference to steps 232 and 234. In step 244, the device management server 165 determines whether all the managed devices are to have the further management action applied thereon. If all the managed devices are to have the further management action applied thereon, the method 200 continues to step 246 where the further management action is provided/performed. If not all the managed devices are to have the further management action applied thereon, the method 200 continues to step 248 in which the device management server 165 determines which of the managed devices are selected for the further management action. Thus, in step 250, the further management action is applied on the selected managed devices.

The exemplary embodiments of the present invention provide a system and method for providing device management. An electronic device of the system may be configured with a variety of input receiving components that generate interaction data that is interpreted by an interaction subsystem and an interaction detection plug-in so that a policy engine refers to aggregation rules so that an appropriate management action is determined to be performed on a local level via local policies and actions stored on a device management agent of the electronic device. The electronic device may further be configured to transmit interaction data to a device management server of the system.

The device management server of the system may be configured to provide device management on a remote level, particularly from the notifications received from the managed electronic devices under the device management server. In a first example, the device management server 165 may be configured to receive management actions from an administrator so that a manual device management action is determined. In a second example, the device management server may be configured to automatically determine management actions using its own policies or rules. In a third example, a history of notifications from the managed electronic devices may be used to determine a management action. In a fourth example, the history of notifications from the managed electronic devices may be used to determine which managed electronic devices the management action is to apply. In a fifth example, the device management server may determine that no management action should yet be taken and that only a review of the notifications should be performed. In a sixth example, the device management server may perform a reactive device management in which the device management server initiates a management action to determine further management actions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
at a device management server communicatively coupled to a plurality of electronic devices:
receiving a first notification data from at least one of the plurality of electronic devices;
selecting at least one electronic device from the plurality of electronic devices to which a temporary management action is to be applied;
determining, based on the first notification data, the temporary management action to be applied to the at least one selected electronic device, wherein the temporary management action configures the at least one selected electronic device to detect usability data related to the temporary management action;
transmitting the temporary management action to the at least one selected electronic device;
receiving usability data related to the temporary management action; and
determining a first management action data as a function of the usability data and the first notification data, the first management action data being indicative of a functionality to be applied to one or more of the plurality of electronic devices.

2. The method of claim 1, further comprising:
receiving at least one second notification data as a function of the at least one second interaction data from the at least one electronic device.

3. The method of claim 2, further comprising:
determining a second management action data as a function of the first notification data and the at least one second notification data.

4. The method of claim 1, further comprising:
selecting at least one of the plurality of electronic devices to which the first management action is to be applied;
transmitting the first management action data from the device management server to the electronic device; and
applying, by the electronic device, the first management action data.

5. The method of claim 1, wherein the at least one of the plurality of the electronic devices generates the first notification data as a function of a first interaction data, the first interaction data being indicative of at least one of a device user interaction, a device environment interaction, and a device state interaction.

6. The method of claim 5, wherein the first notification data is generated from a local device management agent of the at least electronic device.

7. The method of claim 6, wherein the local device management agent of the at least one electronic device includes aggregation rules used by a policy engine to determine a local action to be performed.

8. The method of claim 7, wherein the policy engine determines the first interaction data from combination of lower level interactions, the lower level interaction comprising at least one of a device user interaction, a device environment interaction or a device state interaction.

9. The method of claim 6, wherein the device management agent utilizes a plurality of interaction detection plug-ins, wherein each interaction data plug-in interfaces with at least one of a hardware or a software module configured to detect the first interaction data.

10. The method of claim 5, wherein:
the device user interaction is at least one of graphical gesture data, spatial gesture data, key pad entry data, audio input data, pressure input data, and proximity input data, the device environment interaction is at least one of ambient light level data, orientation data, ambient noise data, location data, ambient temperature data, ambient motion data, extreme motion data, and time data, the device state interaction is at least one of battery level data, external power data, wireless signal data, connectivity data, authentication data, storage use data, utilization data, and pre-emption data.

11. The method of claim 1, wherein the device management server determines that no management action is required.

12. A system, comprising:
a plurality of electronic devices, at least one electronic device of the plurality of electronic devices configured to transmit a first notification data to a device management server; and
the device management server configured to select at least one electronic device of the plurality of electronic devices to which a temporary management action to be applied, the device management server further configured to determine the temporary management action configuring the selected electronic device to detect usability data related to the temporary management action, the device management server further configured to receive usability data related to the temporary management server, the device management server configured to determine a first management action data as a function of a first notification data and the usability data, the first management action data being indicative of a functionality to be applied to one or more of the plurality of the electronic devices.

13. The system of claim 12, wherein the at least one electronic device is further configured to generate at least one second notification data.

14. The system of claim 13, wherein the device management server is further configured to determine a second management action data as a function of the first notification data and at least one second notification data.

15. The system of claim 12, wherein the device management server is further configured to select at least one of the plurality of electronic devices to which the first management action data is to be applied, wherein the device management server transmits the first management action data to the selected at least one electronic device, and wherein the electronic device applies the first management action data.

16. The system of claim 12, wherein the at least one of the plurality of the electronic devices generates the first notification data as a function of a first interaction data, the first interaction data being indicative of at least one of a device user interaction, a device environment interaction, and a device state interaction.

17. The system of claim 16, wherein the first notification data is generated from a local device management agent of the electronic device.

18. The system of claim 17, wherein the local device management agent of the at least one electronic device includes aggregation rules used by a policy engine to determine a local action to be performed.

19. The system of claim 18, wherein the policy engine determines the first interaction data from combination of lower level interactions, the lower level interaction comprising at least one of a device user interaction, a device environment interaction or a device state interaction.

20. The system of claim 17, wherein the device management agent utilizes a plurality of interaction detection plug-ins, wherein each interaction data plug-in interfaces with at least one of a hardware or a software module configured to detect the first interaction data.

21. The system of claim 12, wherein the device management server determines that no management action is required.

22. A computer readable storage medium including a set of instructions executable by a processor, the set of instructions operable to:
at a device management server communicatively coupled to a plurality of electronic devices:
receive a first notification data from at least one of the plurality of electronic devices;
select at least one electronic device from the plurality of electronic devices to which a temporary management action is to be applied;
determine, based on the first notification data, the temporary management action to be applied to the at least one selected electronic device (105), wherein the temporary management action configures the at least one selected electronic device (105) to detect usability data related to the temporary management action;
transmit the temporary management action to the at least one selected electronic device (105);
receive usability data related to the temporary management action; and
determine a first management action data as a function of the first notification data and the usability data, the first management action data being indicative of a functionality to be applied to one or more of the plurality of electronic devices.

* * * * *